No. 733,589.

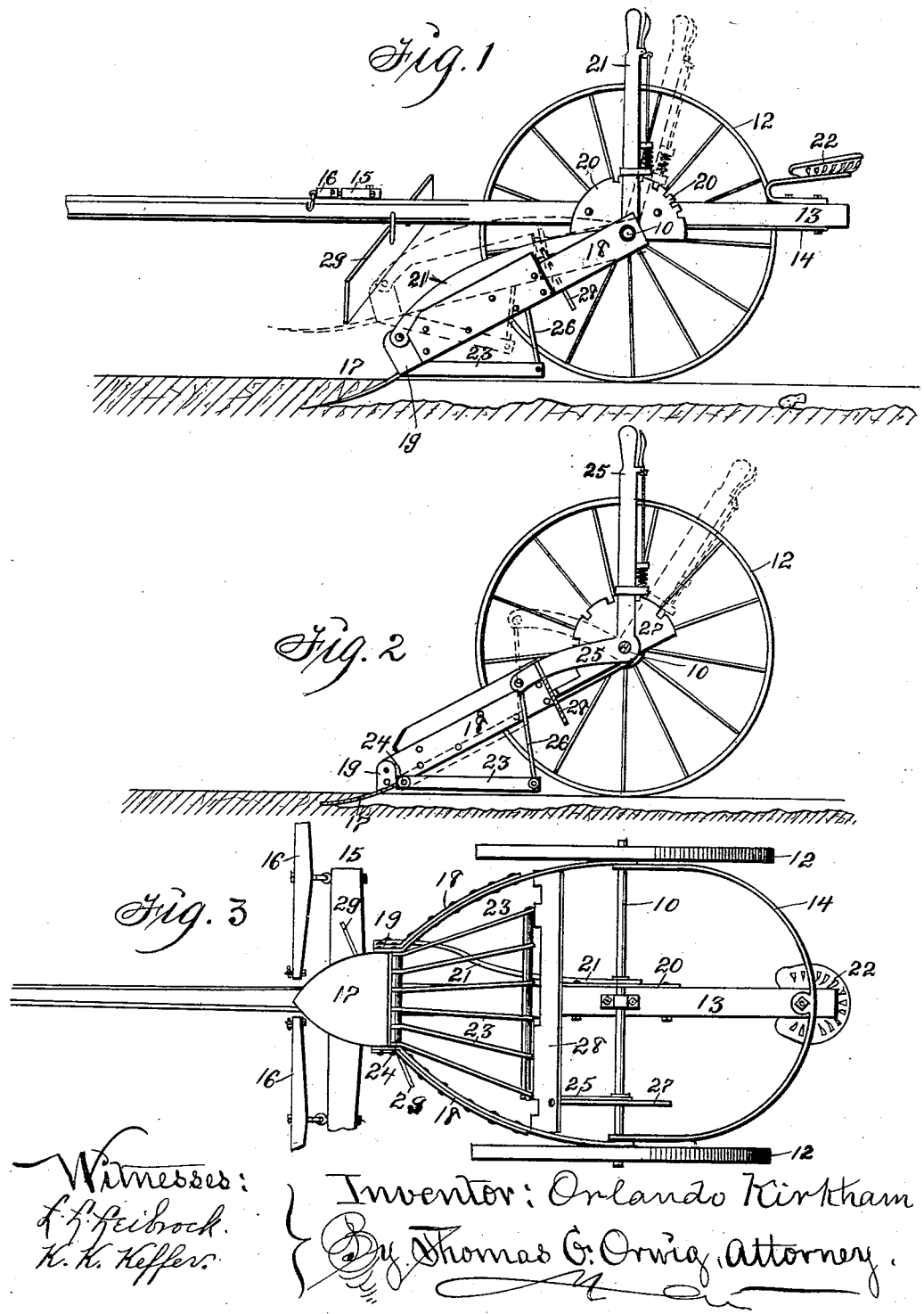

Patented July 14, 1903.

UNITED STATES PATENT OFFICE.

ORLANDO KIRKHAM, OF DIAGONAL, IOWA.

POTATO-HARVESTER.

SPECIFICATION forming part of Letters Patent No. 733,589, dated July 14, 1903.

Application filed April 17, 1903. Serial No. 153,077. (No model.)

*To all whom it may concern:*

Be it known that I, ORLANDO KIRKHAM, a citizen of the United States, residing at Diagonal, in the county of Ringgold and State of Iowa, have invented a new and useful Potato-Harvester, of which the following is a specification.

My object is to provide a simple, strong, and durable potato-harvester upon which the driver can ride and raise and lower the plow, as required, to govern its depth in the ground, to carry it inoperative, and to adjust a separator hinged to the rear end of the plow, as required, to facilitate taking potatoes from the ground and spreading them on top of the loose ground as the carriage is advanced astride a row.

A further object is to deflect vines and the top portion of the ground that is lifted by the plow to one side of the line of advance, while at the same time the lower part of the ground and potatoes therein are carried rearward and spread apart, as required, to separate the potatoes from the ground.

My invention consists in the construction, arrangement, and combination of operative parts with a carriage axle and pole, as hereinafter set forth, pointed out in my claims, and illustrated in the accompanying drawings, in which—

Figure 1 is a side elevation of the machine (that shows only one of the carriage-wheels) and the plow in the ground as required in practical use. Dotted lines indicate how the plow may be elevated and carried inoperative. Fig. 2 is a central sectional view in which dotted lines show the separator elevated, as required, to serve as an inclined plane upon which potatoes can be elevated at the same time the ground falls through the open spaces of the separator to drop on top of the loose ground. Fig. 3 is a bottom view that shows the forms and positions of the different parts relative to each other.

The numeral 10 designates a carriage-axle upon traction-wheels 12, and 13 is a pole pivotally connected with the center of the axle and supported at its rear end by a semicircular brace 14, fixed thereto and to the axle, as shown, or in any suitable way. A doubletree 15 and swingletrees 16 for hitching horses thereto are attached to the pole in a common way.

The plow 17 is pivotally connected with the end portions of the axle 10 by means of curved sides 18, that are fixed to uprights 19, formed on or fixed to the rear-end corners of the plow.

A toothed sector 20 is pivoted to the axle 10 and fixed to the pole 13, and an elbow-shaped lever 21 is fixed to the upright 19, as shown in Fig. 1, and carries a pawl adapted to engage the teeth of the sector 20 in such a manner that the plow can be raised and lowered by the operation of the lever by a person on the seat 22, mounted on the rear end of the pole 13.

A separator, consisting of a plurality of bars 23, hinged to the rear end of the plow 17, by means of a rod 24, fixed in the sides 18 and connected at their rear ends, as shown in Fig. 3, is connected by means of a link 26 with an elbow-shaped lever 25, that is pivoted to the axle 10 in such a manner that the rear end of the separator can be raised and lowered as required to change its inclination relative to the ground for lifting and separating potatoes from the ground. To retain the separator at any degree of angle relative to the ground, a toothed sector 27 is connected to the axle 10 and to a plate 28, fixed to the sides 18 in rear of the separator, as shown in Figs. 2 and 3.

A deflector 29 is fixed to the pole 13 to extend obliquely relative to the line of advance and downward toward the plow in such a manner that weeds, vines, and other obstructions on top of the ground will be pushed to one side of the plow to prevent them passing rearward and upon the separator, as required, to prevent clogging and to facilitate separating potatoes from the ground that passes from the plow to the separator.

Having thus described the purpose of my invention and its construction and operation, the practical utility thereof will be obvious to farmers and others familiar with the art to which it pertains, and

What I claim as new, and desire to secure by Letters Patent, is—

1. In a potato-harvester, a carriage-axle, traction-wheels on the ends of the axle, a pole pivoted to the center of the axle, a brace fixed to the rear end of the pole and pivoted to the end portions of the axle, curved sides pivoted to the end portions of the axle and extended forward for carrying a plow and a plow fixed to the front ends of said sides, and means for raising and lowering the plow, arranged and combined to operate in the manner set forth for the purposes stated.

2. In a potato-harvester, a carriage-axle, traction-wheels on the ends of the axle, a pole pivoted to the center of the axle, a brace fixed to the rear end of the pole and pivoted to the end portions of the axle, curved sides pivoted to the end portions of the axle and extended forward for carrying a plow and a plow fixed to the front ends of said sides, a toothed sector pivoted to the axle, an elbow-shaped lever fulcrumed to the axle and connected with the plow and provided with a pawl to engage the toothed sector, arranged and combined to operate in the manner set forth for the purposes stated.

3. In a potato-harvester, a carriage-axle, traction-wheels on the ends of the axle, a pole pivoted to the center of the axle, a brace fixed to the rear end of the pole and pivoted to the end portions of the axle, curved sides pivoted to the end portions of the axle and extended forward for carrying a plow and a plow fixed to the front ends of said sides, a separator hinged to the rear end of the plow, a toothed sector pivoted to the axle, an elbow-shaped lever fulcrumed to the axle and provided with a pawl to engage said sector and a link connecting the front end of the lever with the rear end of the hinged separator, arranged and combined to operate in the manner set forth for the purposes stated.

4. In a potato-harvester, a carriage-axle, traction-wheels on the ends of the axle, a pole pivoted to the center of the axle, a brace fixed to the rear end of the pole and pivoted to the end portions of the axle, curved sides pivoted to the end portions of the axle and extended forward for carrying a plow, a plow fixed to the front ends of said sides and means for raising and lowering the plow and a deflector fixed to the pole to be carried above the plow, arranged and combined to operate in the manner set forth for the purposes stated.

5. A potato-harvester comprising a carriage-axle mounted upon wheels, a pole pivoted to the center of the axle, a seat on the rear end of the pole, a brace pivoted to the end portions of the axle and fitted to the rear end of the pole, side bars pivoted to the end portions of the axle to extend forward, a cross-piece fixed to the side bars, a plow fixed to the front ends of the side bars, a toothed sector pivoted to the axle, an elbow-shaped lever fulcrumed to said sector and provided with a pawl to engage said sector, a separator hinged to the rear end of the plow, a toothed sector pivoted to the axle, an elbow-shaped lever fulcrumed to the axle, and its front end connected with the rear end of the hinged separator and a deflector fixed to the pole to be carried above the plow, all arranged and combined to operate in the manner set forth for the purposes stated.

ORLANDO KIRKHAM.

Witnesses:
HENRY TODD,
C. HARTER.